US006242562B1

(12) United States Patent
Kobayashi et al.

(10) Patent No.: US 6,242,562 B1
(45) Date of Patent: Jun. 5, 2001

(54) PROCESS FOR PRODUCING VINYL CHLORIDE POLYMER

(75) Inventors: Takashi Kobayashi; Tadashi Amano, both of Kamisu-machi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/468,951

(22) Filed: Dec. 22, 1999

(30) Foreign Application Priority Data

Dec. 28, 1998 (JP) .................................................. 10-374339
Dec. 28, 1998 (JP) .................................................. 10-374340

(51) Int. Cl.$^7$ ....................................................... C08F 6/24
(52) U.S. Cl. ....................... 528/503; 528/502 D; 526/82; 526/83; 526/84; 526/344.2
(58) Field of Search ................................. 526/82, 83, 84, 526/344.2; 528/503, 502 D

(56) References Cited

U.S. PATENT DOCUMENTS 3,138,577 * 6/1964 Kline ............................. 526/344.2 X
4,246,385 * 1/1981 Weintraub ..................... 526/344.2 X
5,449,723 * 9/1995 Amano et al. ................. 526/344.2 X \* cited by examiner Primary Examiner—Fred Teskin
(74) Attorney, Agent, or Firm—Oblon, Spivak, McClelland, Maier & Neustadt, P.C.

(57) ABSTRACT

A process for producing a vinyl chloride polymer is provided which includes the steps of:

(A) suspension polymerizing vinyl chloride or a monomer mixture containing vinyl chloride, in an aqueous medium to obtain a polymer slurry;

(B) stripping unreacted monomers remaining in the polymer slurry; and (C) subjecting the polymer slurry having passed through the step (B), to dehydration at a temperature of from 80° C. to 95° C., preferably within 60 minutes after the stripping. According to this process, the polymer cake obtained after the polymer slurry Is dehydrated can be made to have a greatly low water content. Hence the drying time in the drying step can be shortened to bring about an improvement in productivity and also to achieve a reduction of energy consumption in the drying step and consequently a reduction of production cost. Vinyl chloride polymer dried products having good anti-initial discoloration properties can be obtained.

9 Claims, No Drawings

PROCESS FOR PRODUCING VINYL CHLORIDE POLYMER

BACKGROUND OF THE INVENTION

1. Field of the Invention

This invention relates to a process for producing a vinyl chloride polymer by suspension polymerization.

2. Description of the Prior Art

Vinyl chloride polymers are usually produced through the following steps: the steps of suspension polymerizing vinyl chloride or a monomer mixture containing vinyl chloride, in an aqueous medium in a polymerization vessel to obtain a polymer slurry; collecting unreacted monomers present in the polymerization vessel by evacuation and thereafter removing residual unreacted monomers from the polymer slurry by stripping; dehydrating the polymer slurry having passed through the stripping step, to obtain a polymer cake; and drying the polymer cake. This drying is usually carried out by the use of steam. Thus, the vinyl chloride polymer is obtained as a dried product.

In recent years, it is sought to shorten the time of polymerization production in order to improve productivity. As a part thereof, it is sought to shorten drying time in the drying step when the dried product of a vinyl chloride polymer is obtained. For this end, it is important to lower the water content of the polymer cake to be sent to the drying step after the dehydration. As methods of dehydration by which the water content in the polymer cake can effectively be lowered, a method is employed in which a centrifugal separator such as a screen bowl decanter type or solid bowl decanter type centrifugal separator is used as a dehydrator.

However, even when the dehydrator such as the centrifugal separator is used, the resulting polymer cake still has a water content ranging from 24 to 30% by weight. Such a water content is unsatisfactory from the viewpoint of making the drying time shorter, and it has been sought to make the polymer cake have a much lower water content.

SUMMARY OF THE INVENTION

Accordingly, an object of the present invention is to provide a vinyl chloride polymer production process that can shorten the drying time by lowering the water content in the polymer cake obtained after the polymer slurry is dehydrated.

To achieve the above object, the present invention provides a process for producing a vinyl chloride polymer, the process comprising the steps of;

(A) suspension polymerizing vinyl chloride or a monomer mixture containing vinyl chloride, in an aqueous medium to obtain a polymer slurry;

(B) stripping unreacted monomers remaining in the polymer slurry; and (C) subjecting the polymer slurry having passed through the step (B), to dehydration at a temperature of from 80° C. to 95° C.

According to this process, when dried products of vinyl chloride polymers are produced, the polymer cake obtained after the polymer slurry is dehydrated can be made to have a lower water content. Hence the drying time in the drying step can be shortened to bring about an improvement in productivity and also to achieve a reduction of energy consumption in the drying step and consequently a reduction of production cost.

This process also has an advantage that vinyl chloride polymer dried products having good anti-initial discoloration properties can be obtained when the polymer slurry is subjected to the dehydration within 60 minutes after the stripping is completed.

DESCRIPTION OF THE PREFERRED EMBODIMENTS

The present invention will be described below in greater detail.

(A) Suspension polymerization step:

The suspension polymerization may be carried out under conditions usually employed, without any particular limitations. More specifically, first, vinyl chloride or a monomer mixture containing vinyl chloride, an aqueous medium, a polymerization initiator and a dispersant are charged into a polymerization vessel, and a prescribed polymerization temperature (usually from 30 to 75° C.) is maintained with stirring to polymerize the vinyl chloride or the monomer mixture. At the time the polymerization has reached a prescribed degree (usually from 60 to 98%), the polymerization is terminated. The polymerization may be terminated by, e.g., adding to the reaction mixture an antioxidant having a polymerization inhibitory action.

The monomer to be polymerized is vinyl chloride alone and besides a monomer mixture of vinyl chloride and a monomer that is copolymerizable therewith (a comonomer). (In the mixture, the vinyl chloride may usually be in a content of 50% by weight or more, and preferably 70% by weight or more.) The comonomer is exemplified by α-olefins such as ethylene. propylene, 1-butene, 1-pentene, 1-hexene, 1-heptene, 1-octene, 1-nonene, 1-decene, 1-undecene, 1-tridecene and 1-tetradecene; vinyl esters such as maleic acid and vinyl acetate; vinyl ethers such as lauryl vinyl ether and:isobutyl vinyl ether: maleic anhydride; and vinylidene chloride.

The polymerization initiator is exemplified by diacyl type organic peroxides such as isobutyryl peroxide, 3,5,5-trimethylhexanoyl peroxide and lauroyl peroxide; peroxy ester type organic peroxides such as cumyl peroxyneodecanoate, t-butyl peroxyneoheptanoate, t-butyl peroxyneodecanoate and t-hexyl peroxyneodecanoate; and peroxydicarbonate type organic peroxides such as diallyl peroxydicarbonate and di-2-ethylhexyl peroxydicarbonate. This polymerization initiator may be added in an amount ranging from 0.01 to 0. 3 part by weight, and preferably from 0.03 to 0.2 part by weight, based on 100 parts by weight of the total weight of the monomer charged.

The dispersant is exemplified by cellulose derivatives such as methyl cellulose, hydroxyethyl cellulose, hydroxypropyl cellulose, and hydroxypropylmethyl cellulose; water-soluble or oil-soluble partially saponified polyvinyl alcohols, acrylic acid polymers, and water-soluble polymers such as gelatin. Any of these may be used alone or in combination of two or more types, and may also be used in combination with at least one of a nonionic emulsifying agent such as sorbitan monolaurate, sorbitan trilaurate, glycerol tristearate or ethylene oxide-propylene oxide block copolymer, and anionic emulsifying agent such as polyoxyethylene sorbitan monolaurate, polyoxyethylene glycerol oleate, and sodium lauryl sulfate. Any of these dispersants may be added in an amount ranging from 0.02 to 0.2 part by weight, and preferably from 0.05 to 0.15 part by weight, based on 100 parts by weight of the total weight of the monomer charged.

As the aqueous medium, water may be used. Deionized water or pure water may usually be used as the water.

The aqueous medium may be charged in an amount ranging from 1.0 to 3.0 times and preferably form 1.1 to 2.0 times that of the monomer.

The antioxidant having a polymerization inhibitory action may include, but not limited to, e.g., phenol type antioxidants such as 2,6-di-t-butyl-p-cresol (BHT), 3-t-butyl-4-hydroxyanisol (3-BHA), 2-t-butyl-4-hydroxyanisol (2-BHA), 2,2'-methylene-bis(4-methyl-6-t-butylphenol) (MBMBP), 2,2'-methylene-bis(4-methyl-6-t-butylphenol) (MBEBP), 4,4'-butylidene-bis(3-methyl-6-t-butylphenol) (BBMBP), 4,4'-thio-bis(3-methyl-6-t-butylphenol) (SBMBP), styrenated phenol, styrenated p-cresol, 1,1,3-tris (2-methyl-4-hydroxy-5-t-butylphenyl) butane, tetrakis [methylene-3-(3',5'-di-t-butyl-4'-hydroxyphenyl) propionate] methane, octadecyl-3-(3,5-di-t-butyl-4-hydroxyphenyl propionate), 1,3,5-trimethyl-2,4,6-tris(3,5-di-t-butyl-4-hydroxybenzy 1)benzene, 2,2'-dihydroxy-3,3'-di(α-methylcyclohexyl)-5,5'-dimethyl-diphenylmethane, 4,4'-methylene-bis(2,6-di-t-butylphenol), tris(3,5-di-t-butyl-4-hydroxyphenyl) isocyanurate, 1,3,5-tris(3',5-di-t-butyl-4-hydroxybenzoyl) isocyanurate, bis[2-methyl-4-(3-n-alkylthiopropionyloxy)-5-t-butylphenyl] sulfide, 1-hydroxy-3-methyl-isopropylbenzene, 2,5-di-t-butylhydroquinone, 2,2'-methylene-bis(4-methyl-6-nonylphenol), alkylated bisphenols, 2,5-di-t-amylhydroquinone, polybutylated bisphenol A, bisphenol A, 2.6-di-t-butyl-p-ethylphenol, 2,6-bis(2'-hydroxy-3-t-butyl-5'-methylbenzyl)-4-methylphenol, 1,3,5-tris(4-t-butyl-3-hydroxy-2,6-dimethylbenzyl) isocyanurate, terephthaloyl-di(2,6-dimethyl-4-t-butyl-3-hydroxybenzyl sulfide), 2,6-di-t-butylphenol, 2,6-di-t-butyl-α-dimethylamino-p-cresol, 2,2'-methylene-bis(4-methyl-6-cyclohexylphenol), triethylene glycol-bis[3-(3-t-butyl-5-methyl-4-hydroxyphenyl) propionate], hexamethylene glycol-bis(3,5-di-t-butyl-4-hydroxyphenyl) propionate, 3,5-di-t-butyl-4-hydroxytoluene, 6-(4-hydroxy-3,5-di-t-butylaniline)-2,4-bis(octylthio)-1,3,5-triazine, N,N'-hexamethylene-bis( 3,5-di-t-butyl-4-hydroxy-hydroxyamide, 3,5-di-t-butyl-4-hydroxybenzyl diethyl phosphate, 2,4-dimethyl-6-t-butylphenol, 4,41-methylene-bis(2,6-di-t-butylphenol), 4,4'-thio-bis(2-methyl-6-t-butylphenol), tris[β-(3,5-di-t-butyl-4-hydroxyphenyl) propionyl-oxyethyl] isocyanurate, 2,4,6-tributylphenol), bis [3,3-bis(4'-hydroxy-31'-t-butylphenyl)-butyric acid] glycol ester, 4-hydroxymethyl-2,6-di-t-butylphenol and bis(3-methyl-4-hydroxy-5-t-butylbenzyl) sulfide; amine type antioxidants such as N-phenyl-N'-isopropyl-p-phenylenediamine, N-phenyl-N'-(1,3-dimethybutyl)-p-phenylenediamine, N,N'-diphenyl-p-phenylenediamine and 2,2,4-trimethyl-1,2-dihydroquinoline; sulfur type antioxidants such as dilauryl thiodiproplonate, distearyl thiodipropionate and 2-mercaptobenzoimidazole; and phosphorus type antioxidants such as distearyl pentaerythritol diphosphite.

Of these antioxidants, triethylene glycol-bis[3-(3-t-butyl-5-methyl-4-hydroxyphenyl) propionate], 3,5-di-t-butyl-4-hydroxytoluene, 3-t-butyl-4-hydroxyanisol (3-BHA), 2,5-di-t-butylhydroquinone and octadecyl-3-(3,5-di-t-butyl-4-hydroxyphenyl propionate) are particularly preferred. Any of these antioxidants may be used alone or In combination of two or more types.

From the viewpoint of quality (e.g., anti-initial discoloration properties) and cost, the antioxidant may be added in an amount ranging from 0.0001 to 0.5 part by weight, and preferably from 0.001 to 0.05 part by weight, based on 100 parts by weight of the total weight of the monomer charge.

After the polymerization is terminated, unreacted monomers are collected from the polymerization vessel by evacuation, and the polymer slurry obtained is drawn out of the polymerization vessel to, e.g., a blow-down tank.

(B) Unreacted monomer stripping step:

Next, the polymer slurry obtained in the step (A) is fed to, e.g., a monomer stripping column, and is stripped there. In this step, the unreacted monomers remaining in the polymer slurry are substantially completely removed to become present in a content of 50 ppm or less, and preferably 10 ppm or less.

For the purpose of keeping the resultant final products from their initial discoloration, an antioxidant may be added to the polymer slurry at a time before or after the stripping. or both before and after the stripping. For this purpose, it may preferably be added before the stripping. The antioxidant used here is exemplified by the antioxidants used to terminate polymerization as described above. Namely, since the antioxidant is also used in the step (A) to terminate polymerization, the antioxidant is usually contained in the polymer slurry formed after the stripping of unreacted monomers is completed. In such a polymer slurry formed after the stripping of unreacted monomers is completed, the antioxidant may preferably be contained, when added after the stripping, in an amount ranging from 1 to 3,000 ppm (weight), and more preferably from 5 to 300 ppm. inclusive of the antioxidant added to terminate polymerization.

Since the antioxidant is thus contained in the polymer slurry formed after the stripping is completed, the vinyl chloride polymer contained in the polymer slurry to be fed to the next dehydration step can effectively be prevented from thermally deteriorating. Hence, the vinyl chloride polymer dried product obtained can well be kept from having low anti-initial discoloration properties.

(C) Dehydration step:

In the present invention, the polymer slurry having passed through the step (B) is subjected to dehydration at a temperature of from 80 to 95° C., and preferably from 82 to 92° C. This dehydration may preferably be carried out within 60 minutes after the stripping is completed.

To describe this preferred embodiment in greater detail, the polymer slurry (usually having a temperature of 95° C. or above) obtained after the stripping of unreacted monomers is completed is fed to, e.g., a slurry tank having an external jacket and a stirrer, where the polymer slurry is optionally cooled so as to be controlled within a temperature range of from 80 to 95° C., and thereafter, at the temperature within the above range, fed to a dehydrator within 60 minutes (inclusive of temperature control time) after the stripping is completed, thus the dehydration is carried out.

If the polymer slurry fed to the dehydrator has a temperature lower than 80° C., the polymer cake can not be made to have a sufficiently low water content, so that the drying time in the drying step can not be shortened and also the quantity of steam to be used can not well be reduced. If on the other hand it has a temperature higher than 95° C., the vinyl chloride polymer dried product may come to have low anti-initial discoloration properties undesirably. Meanwhile, the polymer slurry having passed through the step (B) is fed to the dehydrator later than 60 minutes after the stripping is completed, the resultant vinyl chloride polymer dried product may come to have abruptly low anti-initial discoloration properties.

The dehydrator used in the step (C) is exemplified by centrifugal separators such as a screen bowl decanter type or solid bowl decanter type centrifugal separator. As the centrifugal separator, that of a solid bowl decanter type is preferred.

The polymer cake thus obtained after the dehydration has a lower water content than conventional ones as shown later in Examples.

Next, this polymer cake is fed to, e.g., a fluid dryer, and is dried at a drying temperature of from 50 to 100° C., and preferably from 60 to 80° C. until it comes to have a water content of 0.3% by weight or less, thus the vinyl chloride polymer dried product is obtained.

EXAMPLES

The present invention will be described below in greater detail by giving Examples and Comparative Examples. The present invention is by no means limited to the following Examples.

Examples 1 to 4 Comparative Examples 1 to 4

A polymerization vessel made of stainless steel, having an inner volume of 2 m³ and fitted with an external jacket and a stirrer was used as a polymerization vessel for carrying out suspension polymerization of vinyl chloride.

Into this polymerization vessel, 812 kg of deionized water was charged, and then 10 kg of an aqueous solution in which 256 g of water-soluble partially saponified polyvinyl alcohol and 110 g of water-soluble cellulose ether had been dissolved as dispersants was introduced into it, followed by stirring. After the inside of the polymerization vessel was evacuated up to a vacuum of 120 mmHg, 731 kg of vinyl chloride was charged and also 1,024 g of an aqueous emulsion in which 431 g of t-butyl peroxyneodecanoate and 73 g of cumyl peroxyneodecanoate had been dispersed as polymerization initiators was press introduced into it by means of a pump to make up a charge mixture. At the same time when the polymerization initiators were press introduced, hot water was passed into the external jacket to raise the internal temperature to a prescribed polymerization temperature 57° C. to initiate polymerization. At a near approach to an end of temperature rise, cooling water was began being passed into the external jacket to maintain the internal temperature to 57° C. to continue the polymerization. At the time the internal pressure of the polymerization vessel dropped to 5.5 kg/cm² (87% in degree of polymerization), 73 g of 3,5-di-t-butyl-4-hydroxytoluene was added to the polymer mixture as an antioxidant having a polymerization inhibitory action, to terminate the polymerization.

After the polymerization was terminated, unreacted monomers were collected from the polymerization vessel by evacuation, and the polymer slurry obtained was withdrawn from the polymerization vessel. Also, in order to remove unreacted monomers remaining in the polymer slurry, this polymer slurry was fed to a monomer stripping column.

The polymer slurry formed after the stripping of unreacted monomers was completed (concentration of unreacted vinyl chloride: 6 ppm; concentration of polyvinyl chloride solid matter: 44.2% by weight; temperature: 94° C.; polymerization degree of polyvinyl chloride: 950) was fed to a slurry tank fitted with an external jacket and a stirrer, where the temperature of the polymer slurry was adjusted to and maintained at the temperature shown in Table 1. Next, in the state where this temperature was maintained, about 1.30 m³ of the polymer slurry was fed to a solid bowl decanter type continuous centrifugal separator (a horizontal super decanter SHAPLESS CENTRIFUGES JP-U174-4, manufactured by Tomoe Kogyo K.K.) at a rate of 1.90 m³/h to carry out dehydration.

After the dehydration was completed, the water content of the resultant polymer cake was measured according to the following expression. Results obtained were as shown in Table 1.

Water content (%)=[W1/(W1+W2)]×100

W1: Weight of water in the cake.
W2: Weight of polyvinyl chloride.

Then, as the polymer cake obtained, 125 kg (in dry weight) of polyvinyl chloride was immediately fed to a dryer (a fluid dryer FD-STR-60, manufactured by Fuji Sangyo K.K.). and was dried at 70° C. until it came to have a water content of 0.2%. In this way, polyvinyl chloride dried products (of Examples 1 to 4 and Comparative Examples 1 to 4) were obtained.

The drying time taken here is shown in Table 1.

TABLE 1

| | Examples | | | | Comparative Examples | | | |
|---|---|---|---|---|---|---|---|---|
| | 1 | 2 | 3 | 4 | 1 | 2 | 3 | 4 |
| Temperature (°C.) of polymer slurry fed to centrifugal separator | 81 | 85 | 89 | 93 | 58 | 54 | 49 | 39 |
| Water content (%) of dehydrated polymer cake | 21.3 | 20.6 | 20.1 | 19.6 | 24.2 | 24.7 | 25.7 | 26.8 |
| Drying time (min.) | 147 | 142 | 136 | 132 | 170 | 175 | 183 | 192 |

Examples 5 to 10. Comparative Examples 5 to 7

A polymerization vessel made of stainless steel, having an inner volume of 80 m³ and fitted with a ref lux condenser, an external jacket and a stirrer was used as a polymerization vessel for carrying out suspension polymerization of vinyl chloride.

Into this polymerization vessel, 35.5 tons (metric tons; the same applies hereinafter) of deionized water was charged, and then 300 kg of an aqueous solution in which 10.7 kg of water-soluble partially saponified polyvinyl alcohol and 4.6 kg of water-soluble cellulose ether had been dissolved as dispersants was introduced into it, followed by stirring. After the inside of the polymerization vessel was evacuated up to a vacuum of 56 mmHg, 30.5 tons of vinyl chloride was charged and also 48.8 kg of an aqueous emulsion in which 17.4 kg of t-butyl peroxyneodecanoate and 7.0 kg of cumyl peroxyneodecanoate had been dispersed as polymerization initiators was press introduced into it by means of a pump to make up a charge mixture. At the same time when the polymerization initiators were press introduced, hot water was passed into the external jacket to raise the internal temperature to a prescribed polymerization temperature 56° C. to initiate polymerization. At a near approach to an end of temperature rise, cooling water began to be passed into the external jacket. Also, the heat began to be removed by means of the ref lux condenser 20 minutes after the time the internal temperature reached the prescribed 56° C., to maintain internal temperature to 56° C. to continue the polymerization. At the time the internal pressure of the polymerization vessel dropped to 5.5 kg/cm² (87.0% in degree of polymerization), an antioxidant having a polymerization inhibitory action, shown in Table 2 or 3, was added to the polymer mixture to terminate the polymerization.

After the polymerization was terminated, unreacted monomers were collected from the polymerization vessel by evacuation, and the polymer slurry obtained was withdrawn from the polymerization vessel to a blow-down tank with a volume of 150m³. Also, in order to remove unreacted monomers remaining in the polymer slurry, this polymer slurry in the tank was fed to a monomer stripping column.

The polymer slurry formed after the stripping of unreacted monomers was completed (concentration of unreacted monomers: 10 ppm; concentration of polyvinyl chloride solid matter: 41.2% by weight; temperature: 92° C.; polymerization degree of polyvinyl chloride: 1,000; concentration of antioxidant: as shown in Table 2 or 3) was fed to a slurry tank with a volume of 19 m³ fitted with an external jacket and a stirrer, at a rate of 13.5 m³/h [slurry linear velocity (V1) was 0.82 m/s]. Residence time of the polymer slurry in a pipe between the monomer stripping column and the slurry tank (pipe length/in-pipe linear velocity) was 30 seconds. After the polymer slurry was fed to the slurry tank and at the time 12.0m³ Of the slurry had collected in the slurry tank, the polymer slurry was began being fed to a solid bowl decanter type continuous centrifugal separator (a horizontal super decanter manufactured by Tomoe Kogyo K.K.) at the temperature shown in Table 2 or 3 and at a rate of 13.5 m³/h [in-pipe linear velocity (V2) was 0.82 m/s] to carry out dehydration.

The pipe length (L1) from the unreacted monomer stripping column to the slurry tank was set to be Li =25 m, pipe length (L2) from the slurry tank to the continuous centrifugal separator to be L2=75 m, slurry volume (Q) in the slurry tank to be Q m³, and flow rate (q) of the slurry fed to the slurry tank and withdrawn therefrom to be q=13.5 m³/h. Under these conditions, in-pipe residence time (Ta) of the slurry fed from the monomer stripping column to the slurry tank, in-pipe residence time (Tb) of the slurry from the slurry tank to the continuous centrifugal separator, average residence time (Tc) in the slurry tank and total residence time (T) in the slurry tank were calculated according to the following expression.

Ta (minute)=L1/(V1×60)
Tb (minute)=L2/(V2×60)
Tc (minute)=Q/q×60
T (minute)=Ta+Tb +Tc Results obtained are shown in Tables 2 and 3.

After the dehydration was completed, the water content of the resultant polymer cake was measured according to the following expression.

Water content (%)=[W1/(W1+W2)]×100

W1: Weight of water in the cake.
W2: Weight of polyvinyl chloride.

Results obtained are shown in Tables 2 and 3.

Then, the polymer cake obtained was fed to a fluid dryer (manufactured by Nara Kikai Seisakusho) at a rate of 6.1 t/h as polyvinyl chloride in dry weight, and was steam dried at a dryer internal temperature of 75° C. so that the polyvinyl chloride came to have a water content of 0.1% at the discharge orifice of the dryer. In this way, polyvinyl chloride dried products (of Examples 5 to 9 and Comparative Examples 5 to 10) were obtained.

Flow rate of the steam (gage pressure: 3.5 kg/cm²; temperature: 147° C.) so fed as to provide the dryer internal temperature of 75° C. is shown in Tables 2 and 3.

On the polyvinyl chloride dried products thus obtained, their anti-initial discoloration properties were tested in the following way to make evaluation. Results obtained are shown in Tables 2 and 3.

Anti-initial discoloration properties:

In 100 parts by weight of the polyvinyl chloride, 1 part by weight of tin laurate, 0.5 part by weight of a cadmium type stabilizer and 50 parts by weight of dioctyl phthalate were compounded, followed by kneading at 160° C. for 5 minutes by means of a twin-roll mill. Then, the kneaded product obtained was formed into a sheet of 0.8 mm in thickness. Next, this sheet was cut into several sheets, which were then put in layers and put into a mold of 4×4×1.5 cm, followed by heat and pressure molding at 160° C. and 65 to 70 kgf /cm² to prepare a measuring sample. On this measuring sample, its luminosity index L* in Hunter's color difference formula as prescribed in JIS Z-8730 (1980) was determined using a photoelectric colorimeter (manufactured by Nippon Denshoku Kogyo K.K.), and values a* and b* were measured to evaluate anti-initial discoloration properties according to the following ranks.

A: Excellent.
B: Good.
C: A little poor.
D: Poor.

TABLE 2

|  | Ex. 5 | Ex. 6 | Ex. 7 | Ex. 8 | Ex. 9 |
| --- | --- | --- | --- | --- | --- |
| Temp. (° C.) of slurry fed to centrifugal separator | 82 | 85 | 89 | 93 | 87 |
| Stripping column/slurry tank in-pipe residence time (Ta) (min.) | 0.5 | 0.5 | 0.5 | 0.5 | 0.5 |
| Slurry tank/dehydrator in-pipe residence time (Tb) (min.) | 1.5 | 1.5 | 1.5 | 1.5 | 1.5 |
| Average residence time (Tc) in slurry tank (min.) | 54 | 33 | 36 | 30 | 39 |
| Slurry total residence time (T) in slurry tank (min.) | 56 | 35 | 38 | 32 | 41 |
| Type of antioxidant*1) | a | b | e | c | d |
| Amount based on monomer (wt. %) | 0.005 | 0.010 | 0.012 | 0.015 | 0.007 |
| Concentration in Slurry (ppm) | 24 | 49 | 59 | 73 | 34 |
| Dehydrated polymer, cake water content (wt. %) | 21.3 | 20.9 | 20.4 | 19.9 | 20.2 |
| Dryer steam flow rate (t/h) | 1.7 | 1.6 | 1.5 | 1.4 | 1.5 |
| Anti-initial discoloration properties: |  |  |  |  |  |
| L* | 72.7 | 72.8 | 72.6 | 72.6 | 72.7 |
| a* | −1.9 | −1.8 | −1.9 | −2.0 | −1.9 |
| b* | 11.4 | 11.2 | 11.5 | 11.6 | 11.3 |
| Evaluation | A | A | B | B | A |

*1)What letter symbols for antioxidants denote:
a: triethylene glycol-bis[3-(3-t-butyl-5-methyl-4-hydroxyphenyl) propionate]
b: 3,5-di-t-butyl-4-hydroxytoluene
c: 3-t-butyl-4-hydroxyanisol (3-BHA)
d: 2,5-di-t-butylhydroquinone
e: octadecyl-3-(3,5-di-t-butyl-4-hydroxyphenyl propionate)

TABLE 3

| | Com. Ex. 5 | Com. Ex. 6 | Com. Ex. 7 | Ex. 10 |
|---|---|---|---|---|
| Temp. (° C.) of slurry fed to centrifugal separator | 58 | 45 | 97 | 87 |
| Stripping column/slurry tank in-pipe residence time (Ta) (min.) | 0.5 | 0.5 | 0.5 | 0.5 |
| Slurry tank/dehydrator in-pipe residence time (Tb) (min.) | 1.5 | 1.5 | 1.5 | 1.5 |
| Average residence time (Tc) in slurry tank (min.) | 45 | 53 | 46 | 80 |
| Slurry total residence time (T) in slurry tank (min.) | 47 | 55 | 48 | 82 |
| Type of antioxidant*1) | b | a | b | b |
| Amount based on monomer (wt. %) | 0.010 | 0.005 | 0.010 | 0.010 |
| Concentration in slurry (ppm) | 49 | 24 | 49 | 49 |
| Dehydrated polymer, cake water content (wt. %) | 24.3 | 26.0 | 19.4 | 20.8 |
| Dryer steam flow rate(t/h) | 2.2 | 2.4 | 1.4 | 1.6 |
| Anti-initial discoloration properties: | | | | |
| L* | 73.0 | 72.9 | 72.1 | 71.7 |
| a* | −2.0 | −1.9 | −1.8 | −1.8 |
| b* | 11.1 | 11.0 | 12.3 | 12.9 |
| Evaluation | A | A | C~D | D |

What is claimed is:

1. A process for producing a vinyl chloride polymer, the process comprising the steps of:

(A) suspension polymerizing vinyl chloride or a monomer mixture containing vinyl chloride, in an aqueous medium to obtain a polymer slurry;

(B) stripping unreacted monomers remaining in the polymer slurry; and (C) subjecting the polymer slurry having passed through the step (B), to dehydration at a temperature of from 80° C. to 95° C.

2. The process of claim 1, wherein in the step (A) the suspension polymerization is terminated by adding to the reaction mixture an antioxidant having a polymerization inhibitory action.

3. The process of claim 2, wherein said antioxidant is selected from the group consisting of a phenol antioxidant, an amine antioxidant, a sulfur antioxidant and a phosphorus antioxidant.

4. The process of claim 2, wherein said antioxidant is selected from the group consisting of triethylene glycol-bis [3-(3-t-butyl-5-methyl-4-hydroxyphenyl) propionate], 3,5-di-t-butyl-4-hydroxytoluene, 3-t-butyl-4-hydroxyanisol (3-BRA), 2.5-di-t-butylhydroquinone and octadecyl-3-(3.5-dl-t-butyl-4-hydroxyphenyl propionate).

5. The process of claim 1, wherein in the step (C) the dehydration is carried out within 60 minutes after the step-(B) stripping is completed.

6. The process of claim 1, wherein an antioxidant is added before and/or after the step-(B) stripping.

7. The process of claim 1, wherein an antioxidant is contained in the vinyl chloride polymer slurry in an amount of from 1 ppm to 3,000 ppm (by weight) after the step-(B) stripping is completed.

8. The process of claim 1, wherein the step-(C) dehydration is carried out using a centrifugal separator.

9. The process of claim 1, wherein a polymer cake obtained in the step-(C) is dried at a temperature of from 50° C. to 100° C. so as to have a water content of 0.5% by weight or less.

* * * * *